United States Patent
Sonobe

(10) Patent No.: US 10,194,372 B2
(45) Date of Patent: Jan. 29, 2019

(54) RELAYING DEVICE, AUDIO-COMMUNICATION SYSTEM AND RELAYING METHOD FOR RELAYING AUDIO SIGNAL

(71) Applicant: ICOM INCORPORATED, Osaka (JP)

(72) Inventor: Hirotaka Sonobe, Osaka (JP)

(73) Assignee: ICOM INCORPORATED, Osaka (JP)

( * ) Notice: Subject to any disclaimer, the term of this patent is extended or adjusted under 35 U.S.C. 154(b) by 271 days.

(21) Appl. No.: 15/025,155

(22) PCT Filed: Oct. 31, 2014

(86) PCT No.: PCT/JP2014/079132
§ 371 (c)(1),
(2) Date: Mar. 25, 2016

(87) PCT Pub. No.: WO2015/068663
PCT Pub. Date: May 14, 2015

(65) Prior Publication Data
US 2016/0249274 A1  Aug. 25, 2016

(30) Foreign Application Priority Data
Nov. 7, 2013  (JP) .................................. 2013-231597

(51) Int. Cl.
*H04L 12/66*  (2006.01)
*H04W 40/22*  (2009.01)
(Continued)

(52) U.S. Cl.
CPC ......... *H04W 40/22* (2013.01); *H04L 65/1073* (2013.01); *H04L 65/403* (2013.01);
(Continued)

(58) Field of Classification Search
CPC ......... H04W 40/22; H04W 4/10; H04W 4/08; H04W 88/04; H04L 65/602; H04L 65/403;
(Continued)

(56) References Cited

U.S. PATENT DOCUMENTS 8,036,363 B2 * 10/2011 Sakaniwa ........... H04M 1/2745
379/201.01
8,613,029 B2 * 12/2013 Eguchi ................ H04L 12/4625
725/80
(Continued)

FOREIGN PATENT DOCUMENTS

JP  2012-533265 A  12/2012
JP  2013-012793 A  1/2013
(Continued)

OTHER PUBLICATIONS

Kenwood, a wireless apparatus for business use TCP-U90F, URL: http://www.kenwood.com/jp/business/tcp_u90V, Retrieved on Mar. 15, 2016, p. 1-7.
(Continued)

*Primary Examiner* — Lan-Huong Truong
(74) *Attorney, Agent, or Firm* — Muncy, Geissler, Olds & Lowe, P.C.

(57) ABSTRACT

A relay device includes a network communication unit, a control unit, and a session table. The network communication unit receives, from terminal devices, an audio signal to which is attached information for designating the terminal device of the other party of communication. When a calling voice packet is received from one of the terminal devices, the control unit registers, in the session table, a communication session in which this terminal device and the terminal device designated by the designating information constitute participating terminals. Thereafter, the control unit transfers an audio signal received from one of the participating (Continued)

terminals to each of the participating terminals and, when an audio signal is received from two or more of the participating terminals at the same time, mixes the received audio signals and transmits the mixed audio signal to the participating terminals.

13 Claims, 7 Drawing Sheets

(51) Int. Cl.
    *H04M 3/56*     (2006.01)
    *H04W 4/08*     (2009.01)
    *H04W 4/10*     (2009.01)
    *H04L 29/06*     (2006.01)
    *H04W 88/04*     (2009.01)

(52) U.S. Cl.
    CPC ........ *H04L 65/4061* (2013.01); *H04L 65/602* (2013.01); *H04M 3/56* (2013.01); *H04M 3/568* (2013.01); *H04W 4/08* (2013.01); *H04W 4/10* (2013.01); *H04W 88/04* (2013.01)

(58) Field of Classification Search
    CPC ............ H04L 65/1073; H04L 65/1083; H04M 3/568; H04M 3/56
    See application file for complete search history.

(56) References Cited

U.S. PATENT DOCUMENTS

| | | | | |
|---|---|---|---|---|
| 2003/0207690 A1* | 11/2003 | Dorenbosch | .......... | H04W 76/45 455/445 |
| 2005/0123143 A1* | 6/2005 | Platzer | .................... | H04S 7/301 381/2 |
| 2006/0002376 A1* | 1/2006 | Araki | .................... | H04L 12/6418 370/352 |
| 2006/0026002 A1* | 2/2006 | Potekhin | .................... | H04N 7/15 704/275 |
| 2006/0128440 A1* | 6/2006 | Murray | .................... | H04M 1/0214 455/569.1 |
| 2006/0172754 A1 | 8/2006 | Shin et al. | | |
| 2006/0247045 A1* | 11/2006 | Jeong | .................... | H04N 7/15 463/35 |
| 2010/0135481 A1* | 6/2010 | Frauenthal | .................... | H04B 3/23 379/406.06 |
| 2010/0246788 A1* | 9/2010 | Menard | .................... | H04M 3/56 379/159 |
| 2011/0307932 A1* | 12/2011 | Fan | .................... | H04N 21/2547 725/110 |
| 2013/0038676 A1* | 2/2013 | Tanaka | .................... | G06F 3/1454 348/14.08 |
| 2014/0273911 A1* | 9/2014 | Dunn | .................... | H04W 4/90 455/404.1 |

FOREIGN PATENT DOCUMENTS

| | | |
|---|---|---|
| JP | 2013012793 A | 1/2013 |
| JP | 2014-087027 A | 5/2014 |

OTHER PUBLICATIONS

International Search Report of PCT/JP2014/079132.
Open Mobile Alliance Ltd., OMA PoC System Description Open Approved Version 2.1—Aug. 2, 2011, Open Mobile Alliance OMA-TS-PoC_System_Description-V2_1-20110802-A, (Aug. 2, 2011), URL: http://www.openmobilealliance.org/release/PoC/V2_1-20110802-A/OMA-TS-PoC_System_Description-V2_1-20110802-A.pdf, p. 1-421, retrieved on Sep. 12, 2017.
Supplemental European Search Report for corresponding EP application No. 14859428 dated May 19, 2017.

* cited by examiner

| DESTINATION ADDRESS | SENDER ADDRESS | PAYLOAD | | |
|---|---|---|---|---|
| | | AUDIO SIGNAL | PARTNER ID NUMBER (SESSION NUMBER) | SOURCE TERMINAL NUMBER |

TERMINAL TABLE

| TERMINAL NUMBER | ACTIVE FLAG | CONFIGURATION DATA STORAGE ADDRESS |
|---|---|---|
| 1 | ○ | 001 |
| 2 | ○ | 002 |
| ⋮ | ⋮ | ⋮ |
| 100 | × | 100 |

GROUP TABLE ~302

| GROUP NUMBER | BELONGING TERMINAL |
|---|---|
| G1 | 1,2,3,4,5 |
| G2 | 6,7,8,9,10 |
| ⋮ | ⋮ |
| G20 | 96,97,98,99,100 |

FIG.5B

MIXING TABLE ~303

| SESSION NUMBER | CALLING TERMINAL | EXTRA TERMINAL | EXCLUDED TERMINAL | PARTICIPATING TERMINAL | HOLDING TIME (TS) |
|---|---|---|---|---|---|
| G2 | 9 | - | 9 | 6,7,8,10 | 1500 |
| G1 | 23 | 23 | 2 | 1,3,4,5,23 | 1500 |
| 19 | 2 | — | — | 2,19 | 1500 |

FIG.5C

RELAYING DEVICE, AUDIO-COMMUNICATION SYSTEM AND RELAYING METHOD FOR RELAYING AUDIO SIGNAL

BACKGROUND OF THE INVENTION

Technical Field

The present invention relates to an audio communication system using a network such as a wireless LAN.

Background Art

Conventionally, it has been mainly used as a device which performs wireless audio communication, that a wireless communication apparatus that modulates a high frequency carrier at a continuous time signal in an analog signal or a digital signal and transmits the modulated carrier. Although the wireless communication apparatus basically performs one-to-one communication, it has also been proposed the wireless communication apparatus with a group communication function that communicates with a multiple wireless apparatus at the same time. (See non-patent literature 1).

The group communication with the conventional wireless communication apparatuses have been executed by providing a group to which the apparatus itself belongs in each wireless communication apparatus, and determining whether the wireless communication apparatus itself answers to a group call or not. Specifically, when a call for the group communication is performed by another wireless communication apparatus, the wireless communication apparatus determines whether the call for the group communication is for the group to which the apparatus itself belongs or not, and answers the call when the call is for the group to which the apparatus itself belongs. When the same belonging group is provided by a plurality of wireless communication apparatuses (3 or more), the group communication is performed among these wireless communication apparatuses.

PRIOR ART REFERENCE

Non-Patent Literature

Non-Patent Literature 1: JVC KENWOOD Corporation, a wireless apparatus for business use TCP-U90F (URL: http://www2.jvckenwood.com/business/tcp_u90F/)

BRIEF SUMMARY OF THE INVENTION

Although a group communication is possible by using 3 or more wireless communication apparatuses in Non-Patent Literature 1, a communication form is a half-duplex communication scheme. Thus, only one apparatus can transmit an audio signal (possible to speak), even in the group communication. When 2 or more apparatuses transmit audio signals at the same time, the wireless communication apparatus transmitting the audio signal can't receive signals which are sent by other apparatuses. Furthermore, the wireless communication apparatus which is being received cannot hear the sound because a plurality of transmission signals are congested.

In the group communication wherein the belonging group is stored in the wireless apparatus mentioned above, it cannot be totally managed that any wireless apparatus belongs to any group. Furthermore, the group setting cannot be modified flexibly in response to current situations because the belonging group can be modified only in each wireless apparatus.

The purpose of the present invention is to provide an audio communication system which enables the high flexibility of the group communication by connecting a relaying device to a terminal device, which is a communication apparatus, via a communication network, and making the relaying device manage the group of the terminal device.

A relaying device of the present invention comprises a network communication unit for communicating with a terminal device via a network, a control unit for controlling communication with the terminal device and a storage unit in which a session table is provided. The network communication unit receives an audio signal to which information designating the terminal device of a communication partner is attached from the terminal device. The control unit registers a communication session made up of participating terminals of the terminal device transmitting the audio signal and the terminal device designated by the designating information attached to the audio signal into the session table when the first audio signal (for example, a calling voice packet, as described below) is received from the terminal device. To establish the communication session, it is only necessary to start transmitting the audio signal and a procedure in advance such as SIP procedure is not needed. Thereafter, the control unit transfers the audio signal received from the participating terminal including the first audio signal to each terminal, mixes these audio signals and transmits the mixed audio signal to the participating terminals when the audio signals are received from two or more participating terminals at the same time.

A program of the present invention drives the computer of the relaying device, comprising the network communication unit for communicating with the terminal device via network and the storage unit in which the session table is provided, to function as a first, second and third means. The first means registers the communication session that the terminal device transmitting the audio signal and the terminal device designated by the designating information attached to the audio signal are the participating terminals into the session table when the first audio signal to which the designating information for designating the terminal device of a communication partner is attached is received from the terminal device. The second means transfers the audio signal received from the participating terminal including the first audio signal to each participating terminal. The third means mixes the audio signals and transmits the mixed audio signal to the participating device when the audio signals are received from two or more participating terminals at the same time.

The relaying method of the present invention relays the audio signal by using the relaying device having the network communication unit for communicating with the terminal device via network, and the storage unit in which the session table is provided. In a first step, the relaying devices registers the communication session that the terminal device transmitting the audio signal and the terminal device designated by the designating information which is attached to the audio signal are participating terminals into the session table when the first audio signal to which the designating information for designating the terminal device of a communication partner is attached is received. In a second step, the relaying device transfers the audio signal received from the participating terminal device, including the first audio signal to each participating terminal. In a third step, when the audio signals are received from two or more participating terminals at the same time, the relaying device mixes these audio signals and transmits the mixed audio signal to the participating terminals.

The control unit, the third means, or the relaying device in the third step may transmit the mixed audio signal that the received audio signals are mixed excluding the signal transmitted from itself to each participating terminal.

The control unit, the first means, or the relaying device in the first step may delete the communication session from the session table when a predetermined time or more elapses without receiving the audio signal from any of the participating terminals.

The control unit, the first means, or the relaying device in the first step may register the communication session which is established between the participating terminals consisting of the terminal device transmitting the audio signal and the terminal device belonging to the prepared group into the session table of the storage unit when the designating information attached to the first audio signal received from the terminal device designates the prepared group.

The control unit, the first means, or the relaying device in the first step may also register a new communication session which is established between the participating terminals consisting of the terminal device transmitting the audio signal and the terminal device designated by the designating information into the session table of the storage unit when the audio signal to which the designating information designating at least one of the terminal devices which is not included to the participating terminal of the communication session registered in the session table is received.

The control unit, the first means, or the relaying device in the first step, when the participating terminal of the newly registered communication session includes at least one participating terminal of the communication session registered beforehand, may delete the terminal device which participates in both communication sessions from the communication session registered beforehand.

An audio communication system of the present invention comprises a terminal device having a microphone, an audio output unit, and a terminal network communication unit and a relaying device having a network communication unit, a control unit, and a storage unit. The terminal network communication unit of the terminal device and the network communication unit of the relaying device transmit and receive the audio signal via network. The terminal device attaches designating information designated the terminal device of a communication partner to the audio signal input from the microphone, transmits it to the relaying device, and reproduces the audio signal received from the relaying device. A session table is provided in the storage unit of the relaying device. The network communication unit of the relaying device receives the audio signal to which the designating information is attached from the terminal device. The control unit registers the communication session that the terminal device transmitting the audio signal and the terminal device designated by the designating information which is attached to the audio signal are the participating terminals into the session table when the first signal (the calling voice packet) is received. To establish the communication session, it is only necessary to start transmitting the audio signal and a procedure in advance such as SIP procedure is not needed. Thereafter, the control unit transfers the audio signal received from the participating terminal, including the first audio signal, to each participating terminal, and mixes these audio signals and transmits the mixed audio signal to the participating terminals when the audio signals are received from two or more participating terminals at the same time.

The terminal device further comprises a push-to-talk (PTT) circuit. The terminal network communication unit may transmit the audio signal input from the microphone to the relaying device while the push-to-talk circuit is in ON status and receives the audio signal transmitted from the relaying device regardless of that the push-to-talk circuit is in ON/OFF status.

The network comprises a plurality of the access points for the wireless local area network, and the terminal network communication unit of the terminal device may connect to the network via any one of the access points.

According to the present invention, it will be able to provide a highly flexible group communication by connecting a relaying device to a terminal device via a network, and making the relaying device relay the communication among other terminal devices.

BRIEF DESCRIPTION OF DRAWINGS

FIG. 5B shows a group table which is provided in the server.

FIG. 5C shows a mixing table which is provided in the server.

DETAILED DESCRIPTION OF THE EMBODIMENT

Figure 1:
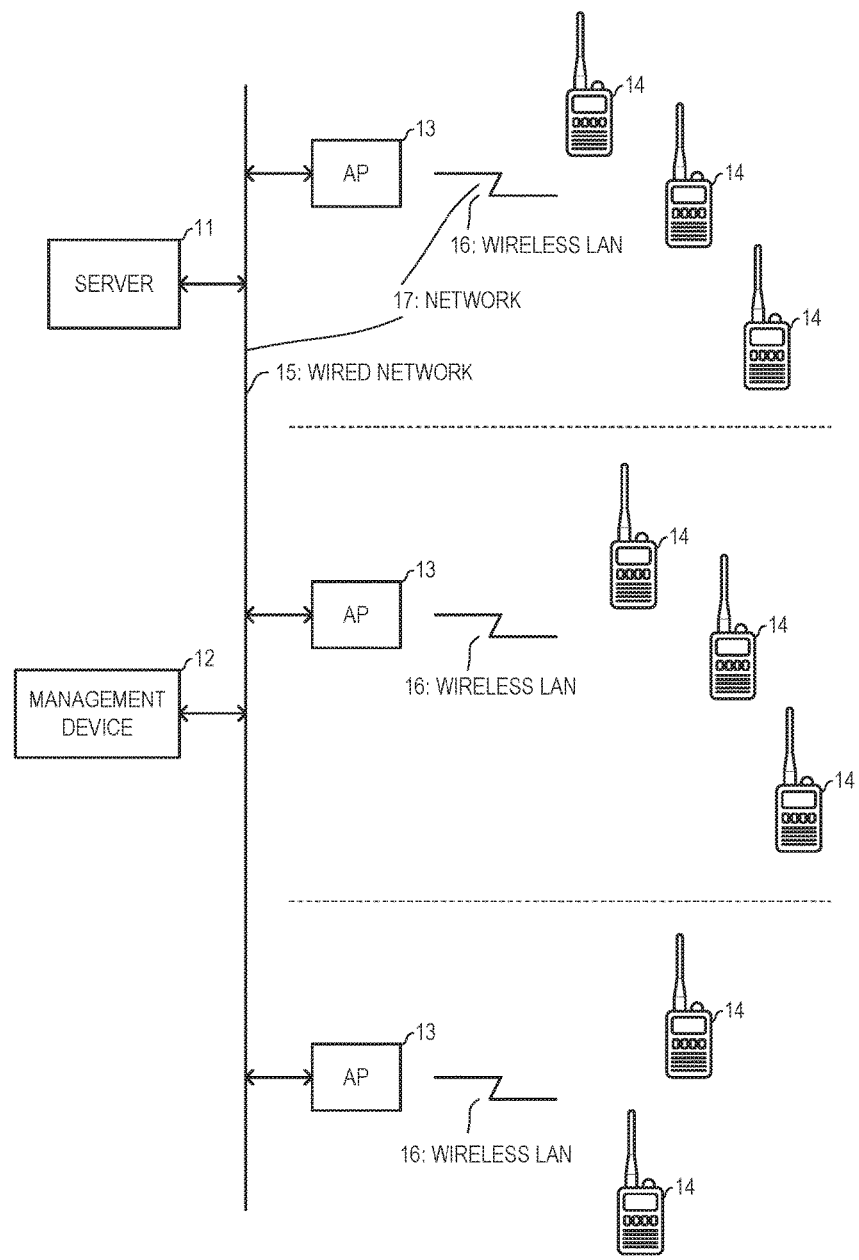
FIG. 1 shows a configuration of a communication system according to the embodiment of the present invention.
Figures 2, 3:
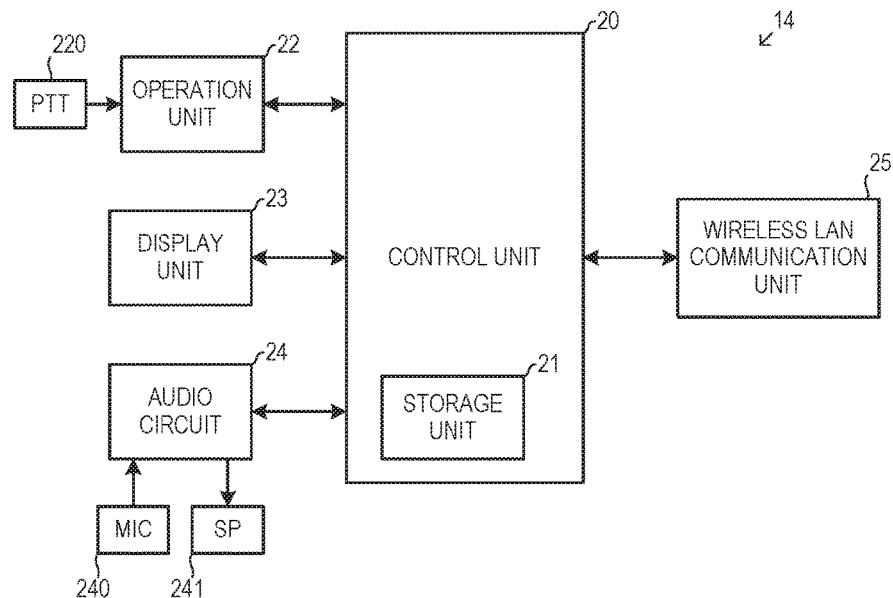
FIG. 2 is a block diagram of a transceiver which is a terminal device.
FIG. 3 shows an example of a constitution of a voice packet.

Referring to the figures, an audio communication system, which is the embodiment of the present invention, will be explained. FIG. 1 shows a configuration of a communication system according to the embodiment of the present invention. In the audio communication system, a plurality of terminal devices 14 communicate mutually, using a wireless LAN 16 such as Wi-Fi. The shape of the terminal device 14 is similar to a handy transceiver for wireless communication, which has a push-to-talk (Push to Talk: PTT) switch 220 as shown in FIG. 2. In terms of functions, the terminal device 14 is a wireless network device which transmits and receives the voice packet via a wireless access point (AP) 13. The server 11, which is the relaying device, relays the mutual communication of a plurality of the terminal devices 14 via a wired network 15 or a wireless Local Area Network (LAN) 16. Hereinafter, the wired network 15 and the wireless LAN16 are collectively referred to as a network 17.

The terminal device 14 is connected to the network 17 on start-up. The server 11 transmits the configuration data to the terminal device 14, and sets up the terminal device 14 for a communicable state, when the terminal device 14 is connected to the network 17. The configuration data transmitted from the server 11 contains, for example, a group number to which the terminal device 14 can communicate or an updating program. Furthermore, at any subsequent timing, the server 11 transmits each kind of configuration data to the terminal device 14. The any subsequent timing is, for example, at regular time intervals or when the connected wireless access point 13 is switched.

Ethernet (registered trademark) LAN, the Internet and the like can be used as the wired network 15. Secure communication is available by using Virtual Private Network (VPN) when the wired network 15 includes the Internet. A communication system based on IEEE802.11 such as Wi-Fi can be applied as the wireless LAN 16. The terminal device 14 communicates with the wireless access point13 via the communication system of the wireless LAN 16.

A plurality of the wireless access points 13 are installed. Each wireless access point 13 is installed respectively, for example, on a different floor or in a different room of a building. Thus, it is possible to estimate the floor or the room where the terminal device 14 stays, depending on which communication areas of the wireless access points 13 the terminal device 14 is belonging to.

A management device 12 is connected to the wired network 15. The management device 12 consists of a personal computer in which a management program is installed and the like. The management device 12 accesses to the server 11 in response to the operation by the administrator and sets the tables shown in FIG. 5A, 5B in the server 11. The management device 12 also functions as a terminal device, and it is possible to communicate with another terminal device 14.

FIG. 2 is a block diagram of the terminal device 14. As mentioned above, in terms of functions, the terminal device 14 is a wireless network device which transmits and receives a voice packet via the wireless access point (AP) 13 of the wireless LAN. A control unit 20 controls an operation of the terminal device 14, which consists of a microprocessor. The control unit 20 has a storage unit 21 in which various data is stored. The configuration data which is downloaded from the server 11 is stored in the storage unit 21. An operation unit 22, a display unit 23, an audio circuit 24 and a wireless LAN communication unit 25 are connected to the control unit 20. The operation unit 22 includes key switches such as the PTT switch 220. The operation unit 22 receives the user's operation and inputs its operation signal to the control unit 20. The display unit 23 includes a liquid-crystal display. The liquid-crystal display shows an identification number of the communication partner whom the user's operation selects, the identification number of the called communication partner and the like.

The audio circuit 24 has a microphone 240 and a speaker 241. The control unit 20 decodes the received voice packet and inputs it into the audio circuit 24. The audio circuit 24 converts the decoded audio signal to the analog signal and outputs it through the speaker 241. The audio circuit 24 also converts the audio signal input by the microphone 240 to the digital signal and inputs it into the control unit20. The control unit 20 packetizes the digital audio signal to the voice packet and inputs it into the wireless LAN communication unit 25. The wireless LAN communication unit 25 has a circuit which performs wireless communication by the communication method complying with IEEE802.11. The wireless LAN communication unit 25 transmits the packet input from the control unit 20 to the wireless access point 13 and inputs the received packets from the wireless access point 13 into the control unit 20.

When the user emits a voice to the microphone 240 with pressing the PTT switch 220, the terminal device 14 converts the voice (audio) signal to the voice packet and transmits it to the server 11. The voice packets has a constitution as shown in FIG. 3. A header of the voice packet includes a destination address and a sender address. The payload includes the digitalized audio signal, an identification number of the communication partner (a partner ID number) and a source terminal number. The partner ID number is information for identifying a target device. The terminal number of the terminal device 14 is used as the partner ID number in individual communication, and a group number of the group is used as the partner ID number in group communication. The final destination of the audio signal is the terminal device of the communication partner, although the address of the voice packet transmitted from the terminal device 14 is the server 11. The server 11 takes out the payload from the voice packet and transfers the audio signal to the terminal device 14 of the communication partner, when the voice packet is received. When the partner ID number is the group number, that is, in the case of the group communication, the voice packet is transferred to a plurality of the terminal devices 14 which belong to the group.

So as to transfer the audio signal, a new voice packet which contains the IP address of the transferred terminal device 14 as the destination address and the IP address of the server 11 as the sender address is generated. In the individual communication, the partner ID number and the source terminal number contained in the payload of the new packet are same as that of the voice packet received by the server 11. In the group communication, the partner ID number contained in the payload of the new packet is same as that of the voice packet received by the server 11. Furthermore, the source terminal number in the new voice packet may be cleared, or be attached the same one of the voice packet received by the server 11.

To summarize the above process, the terminal device 14 transmits the voice packet containing the audio signal input from the microphone 240 and the attached partner ID number to the server 11, without performing the procedures for establishing communication such as a SIP procedure, when the PTT switch 220 is turned on. The server 11 transfers the audio signal to the communication partner identified by the partner ID number. Thus, the audio communication system of the embodiment allows the user to start communication almost at the same time of turning on the PTT switch 220, and to perform communication with sense of use like using the conventional wireless communication transceiver due to starting the communication by transmitting the voice packet (RTP packet). For the sense of use, the server 11 manages the IP address, the group and the like of each terminal device 14, and transfers the audio signal.

The terminal device 14 has a VOX circuit along with the PTT switch 220. The VOX circuit is the circuit that determines whether a talking voice (the audio signal) is input on the basis of the input level of the microphone 240 and the duration time, and makes the terminal device switch to the transmitting state (PTT switch is turned on), when it is determined that the talking voice is input. The terminal device 14 may switch transmitting on/off using the VOX circuit, instead of the PTT switch 220 or with PTT switch 220. A general wireless communication transceiver has a simplex system which cannot receive a radio signal during transmitting. On the other hand, the terminal device 14 can transmit and receive the voice packet simultaneously because the audio signal is transmitted and received by the voice packet communication via the wireless LAN16. The terminal device 14 can communicate by a full-duplex method which transmits and receives the audio signal simultaneously. Not to keep transmitting a silent voice packet, even when it performs the full-duplex communication, the terminal device 14 edits and transmits the voice packet by the PTT switch 220 or the VOX function only in case that the talking voice is input.

The server 11 transfers the audio signal contained in the voice packet received from the terminal device 14 via the network 17, to the terminal device 14 of the communication partner via the network 17. In the group communication, the audio signal is transferred to the terminal devices 14 belonging to the group. In the group communication, it may occur that a plurality of the users speak at the same time and the audio signals are transmitted from a plurality of the terminal devices 14 to the server 11 simultaneously. In this case, the server 11 edits a new audio signal mixing the received audio signals, makes the voice packet containing the mixed new audio signal, and transfers it to each of the terminal devices 14. In this case, the server 11 mixes individually for each terminal device 14 belonging to the group, and the audio signal transmitted by the device itself is not made to be included and returned in the mixed audio signal for each terminal device 14. That is, the audio signal mixed all received audio signals are transferred to the terminal device 14 which does not transmit the audio signal, and the audio signal mixed the received audio signals other than that transmitted by the terminal device 14 is transferred to the terminal device 14 transmitted the audio signal. Thus, echoes of the self-transmitted audio signal are cancelled in the terminal device 14.

When the group communication is performed, a composition of the terminal device 14 of the group is not fixed, but it flexibly increases or decreases in response to the current communication situation of each terminal device. Details will be explained referring to the table in FIG. 5.

Figures 4, 5A:
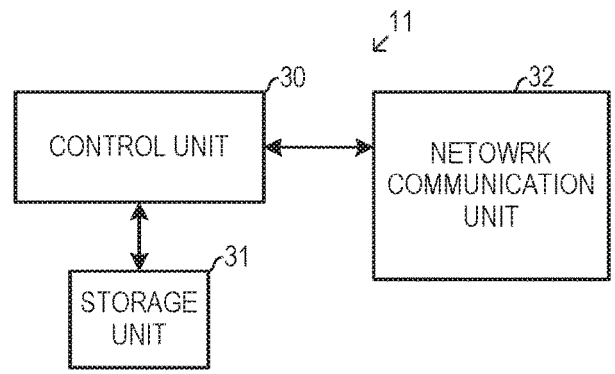
FIG. 4 is a block diagram of a server.
FIG. 5A shows a terminal table which is provided in the server.

FIG. 4 is a block diagram of the server 11. The server 11 has a control unit 30, a storage unit 31 and a network communication unit 32. The storage unit 31, for example, consists of a hard disc, RAM and the like, and stores tables shown in FIG. 5, the configuration data of each terminal device and the like. The control unit 30 performs setting up the terminal device 14, mixing the audio signal and the like. The network communication unit 32 controls the communication with the wired network 15.

FIGS. 5A, 5B and 5C are diagrams showing tables provided in the storage unit 31 of the server 11.

FIG. 5A is a diagram showing a terminal table 301. The terminal table 301 is a table for the server 11 managing the terminal device 14. Each terminal device 14 is identified by an identification number (a terminal number) which is assigned respectively so as to be unique. An active flag and a storage address of the configuration data for every terminal number are stored in the terminal table 301. The active flag indicates that the terminal device14 is connected to the network 17, is registered by the server 11 and has downloaded various data by accessing the server 11, that is, it is possible to perform wireless communication by completing the registration. The active flag is set when the server 11 completes the registration of the terminal device 14. The configuration data is, for example, the updating data of the program (a firmware), its own group, an address book storing another group which is permitted to communicate and the like.

The server 11 performs the registration of the terminal device 14 communicating with it, when the terminal device 14 is connected to the network 17. Moreover, the server 11 updates the registration of the terminal device 14 communicating with the terminal device 14 at the appropriate timing thereafter. The appropriate timing thereafter means, for example, at regular time intervals or when the connected wireless access point 13 is switched.

The user operates the terminal device 14 and makes a candidate number of the communication partner display on a display unit 23, when the user selects the communication partner. The candidate number of the communication partner means the terminal number of the active terminal device 14 described above and the group number whose communication is permitted.

FIG. 5B shows a group table 302. The group table 302 is the table for the server 11 to manage the group. Each group is identified by the identified number (the group number) which is assigned respectively so as to be unique. The group number and the terminal number of the terminal device 14 (a belonging terminal device) which belongs to the group are stored in the group table 302 for every group number. The terminal device 14 which belongs to the group may be one or more. The group registered in the group table 302 is corresponded with the prepared group in this invention. A terminal table 301 and the group table 302 are provided in the server 11 by the administrator operating the management device 12.

FIG. 5C shows a mixing table (a session table) 303. The mixing table 303 is the table for the server 11 to manage the communication session. The communication session is a communication state among a plurality of the terminal devices 14 with the server 11 as the relaying device. The mixing table 303 has a plurality of lines, and each line stores one unit of information of a communication session. When the audio signal (the voice packet) is received from the terminal device 14, the server 11 determined which communication session the audio signal is distributed in by referring to the mixing table 303.

The communication session based on the voice packet is registered in the mixing table 303, when the server 11 receives the calling voice packet which is the first voice packet from the terminal device 14.

For each communication session, items such as a session number, a calling terminal number, a participating terminal number, an extra terminal number, an excluded terminal number and remaining holding time (T1) are provided in the mixing table 303. The session number is the number for identifying the communication session. The calling terminal number is the terminal number of the terminal device 14 (the calling terminal device) for transmitting the first voice packet (a calling voice packet) of the communication session. In this embodiment, the partner ID number contained in the calling voice packet is used for the session number, though any unique value for each communication session may be used. The communication session that the terminal number is registered as the session number (such as "19") is the communication session of the individual communication. The individual communication is the one-on-one, individual communication between the terminal devices 14. The communication session that the group number is registered as the session number (such as "G1") is the communication session of the group communication. The group communication is the communication that a plurality of the terminal devices 14 (typically more than 3) exchange the audio signal mutually.

The participating terminal number is a list of the terminal number of the terminal device 14 which participates in the communication session. When the voice packet is transmitted from the terminal device 14 whose terminal number is registered in the participating terminal number, the control unit 30 transfers the voice packet to another terminal device 14 whose terminal number is registered in the participating terminal number, therefore executes the mutual communication between the participating terminal devices.

In the case of the group communication session, the participating terminal number is the terminal number of the calling terminal device and the terminal number of the terminal device 14 which belongs to the group designated by the communication partner. However the terminal device 14 which belongs to the group but is not active or which performs another individual communication session cannot participate in the group session. The terminal number thereof is excluded from the participating terminal number (, which is registered in a field of excluded terminal numbers). In case that the calling terminal device does not belong to the group, that is, the terminal device 14 calls a group other than its own belonging group, the terminal number thereof is also registered as the participating terminal number of the group communication session. The terminal number is registered simultaneously in a field of an extra terminal number as an extra terminal number registered as an extra member. That is, the calling terminal device is treated as the terminal device 14 participating in the communication session (the participating terminal device) as well as the terminal device belonging to the group, even if it does not belong to the group. Note that the fields of the extra terminal number and the excluded terminal number are not essential. It is possible to manage the table only by adding or excluding the terminal number to the field of the participating terminal number.

In the case of the individual communication session, the terminal number of the calling terminal device and the terminal device 14 of the communication partner as the participating terminal number are registered. The extra terminal number and the excluded terminal number are not registered because of one-on-one communication.

Holding time is the time the communication session is being kept without cancel with the state that the voice packet is not transmitted from the participating terminal device. The holding time of each communication session in the server 11 is set, for example, to 30 seconds. A holding timer (TS) of the mixing table 303 is the timer which counts a lapse of the holding time, when the voice packet is not transmitted. In the processing by the control unit 30 (referred in FIG. 7), the holding timer TS is counted down if the voice packet is not transmitted, and is reset to 30 seconds, if the voice packet is transmitted. In the event the timer TS is up because the voice packet is not transmitted from the participating terminal device for 30 seconds, the communication session is canceled and information of the communication session is deleted from the mixing table 303.

In the embodiment above, in the group communication session, the calling terminal device is additionally registered in the item of the participating terminal device of the mixing table 303 other than the belonging terminal device, and even if it is the belonging terminal device, the terminal devices 14 which is not active and which performs another communication session are excluded. However, the terminal device 14 additionally registered in the item of the participating terminal device and the terminal device 14 excluded from the item of the participating terminal device are not limited to these.

When a participating terminal device starts another communication session (an individual communication session) in the middle of a group communication session, it is excluded from the participating terminal device of the group communication session at that time. That is, the terminal number of the terminal device 14 is shifted from the field of the participating terminal number to the field of the excluded terminal number.

To continue the communication session, it is also necessary that the holding time is counted in each terminal device 14. The holding time (T1) of the terminal device 14 is shorter than that of the server 11 (TS=30 seconds), for example, 5 seconds is set in the timer T1. The user can start another communication session by predetermined operation when 5 seconds elapses after turning off the PTT switch 220, even if the communication session is maintained in the server 11.

It may also divide the mixing table 303 into 2 tables, an executing mixing table and a saving table. The executing mixing table is a table for registering the session executing mixing, and generated on a high-speed memory. The session in which the communication (transmitting and receiving the voice packet) stops is transcribed into the saving table in a short time of about 200 milliseconds, and kept only during the holding time (T1) in the saving table. When the communication (transmitting and receiving the voice packet) occurs again during the holding time, the session is transcribe again into the executing mixing table, and used for performing mixing. Thus, it becomes possible to release rapidly each terminal device from the mixing table 303.

Figure 6:
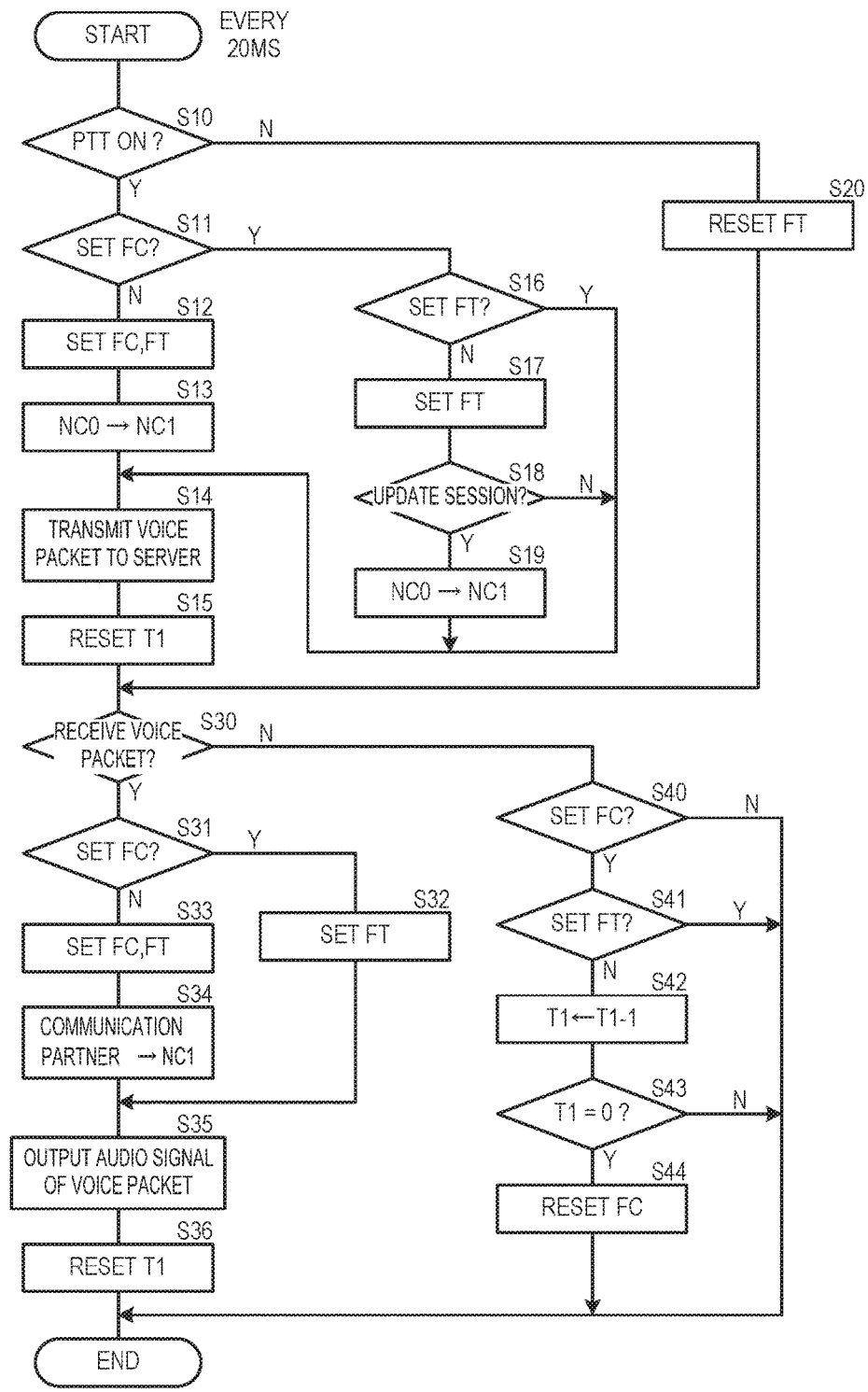
FIG. 6 is a process flowchart of a transceiver.

FIG. 6 is a flow chart showing communication control processing performed by the control unit 20 of the terminal device 14. The processing is performed repeatedly every 20 milliseconds. Current communication state (status) is determined in response to turning on/off of the PTT switch 22 or receiving the voice packet (RTP packet). The kinds of flags or timers used in the flow chart are as follows.

PTT: It is the abbreviation of the Push-To-Talk switch (PTT switch) 220, which is not limited that the PTT switch 220 is turned on/off. It is also included that the transmission signal by the VOX circuit is on/off.

NCO: The identification number (the terminal number/the group number) of the communication partner selected by the operation of the user.

NC1: The session number, the identification number which identifies the performing communication session, and the identification number (the terminal number/the group number) of the communication partner which is contained in the first voice packet establishing the communication session are used.

FC: A communication session flag (the flag showing that the terminal device 14 participates in the communication session)

FT: A communicating flag (the flag showing that the voice packet is being transmitted or being received)

T1: A holding timer (the timer counting the holding time (5 seconds) of the communication session)

S10-S20 are management processing for transmitting the voice packet. The control unit 20 determines the state of the PTT switch 220 (S10). The control unit 20 proceeds the processing to S11 in case that PTT switch 220 is being turned on, and proceeds the processing to S12 in case that the PTT switch is being turned off.

In S11, the control unit 20 determines whether the communication session flag FC is set or not. When the communication session flag FC is not set (No in S11), the voice packet which is generated by the PTT switch 220 being turned on this time is the calling voice packet. The control unit 20 sets the communication session flag FC and the communicating flag FT showing that the voice packet is being transmitted or received (S12). The control unit 20 transcribes the communication partner number NCO selected by the user into the communication session number NC1 (S13), and transmits the voice packet containing the communication session number NC1 with the audio signal in the payload to the server 11 (S14). By transmission of the calling voice packet, the communication session is started by the server 11. The control unit 20 proceeds management processing for receiving the voice packet in S30 and following steps after resetting the holding timer T1 to 5 seconds (S15).

In case that the communication session flag FC has already been set in S11 (Yes in S11), the control unit 20 determines whether the communicating flag FT is set or not, that is, the voice packet is being transmitted or received (S16). When the communicating flag FT is not set (No in S16), the control unit 20 sets the communicating flag FT (S17). In case that a new voice packet (talking voice of the user) is started transmitting with the state in which the communication session already started is maintained, the processing is proceeded from S11 to S16, and then to S17. In S18, the control unit 20 determines whether to maintain the now existing communication session (No in S18), or to establish another new communication session leaving from the existing communication session (Yes in S18). It meant that the control unit 20 determines whether to reply to the existing communication session with the voice packet (No in S18), or to send the voice packet to a new communication partner of the new communication session (Yes in S18). It may be determined, for example, according to whether the operation by the user just before turning on the PTT switch 220 this time, such as the selection operation of the communication partner, is performed or not. When the user performed the selection operation of a new communication partner, it may be established the new communication session to the selected communication partner in S19.

In case of updating the communication session (Yes in S18), the control unit 20 transcribes the communication partner number NCO selected then into the communication session number NC1 (S19) and proceeds the processing to S14. In case of continuing the communication session already started (No in S18), the control unit 20 proceeds the processing from S18 to S14 directly.

When the PTT switch 220 is not turned on in S10 (No in S10), the control unit 20 resets the communicating flag FT (S20). In addition, in case that the communicating flag FT has already been reset, it may be as it is. Thereafter, the control unit 20 proceeds the management processing for receiving the voice packet in S30 and following steps.

The control unit 20 determines whether the voice packet is received via the network 17 or not in S30. The control unit 20 proceeds the processing to S31, when the voice packet is received. The control unit 20 proceeds the processing to S40, when the voice packet is not received.

In S31, the control unit 20 determines whether the communication session flag FC is set or not. When the communication flag FC is not set (No in S31), a new communication session is established this time, whose first voice packet is determined to be transmitted, and the communication session flag FC and the communicating flag FT are set (S33). The FT flag is the flag showing that the voice packet is being transmitted or received. The control unit 20 transcribes the communication partner number which is included in the voice packet into the communication session number NC1 (S34). The control unit 20 outputs the voice packet to the audio circuit 24 (S35), and resets the holding timer T1 to 5 seconds.

In case that the communication session flag FC has already been set in S31 (Yes in S31), the control unit 20 sets the communicating flag FT in response to receiving the voice packet this time (S32). In addition, in case that the communicating flag FT has already been set, it is kept as it is. Thereafter, the control unit 20 proceeds the processing to S35.

When the voice packet is not received in S30 (No in S30), the control unit 20 determines whether the communication session flag FC is set or not (S40). In case that the communication session flag FC is set (Yes in S40), the control unit 20 performs the processing in S41 and following steps. When the communication session flag FC is not set (No in S40), the control unit 20 finishes the processing without more steps.

In S41, the control unit 20 determines whether the communicating flag FT is set or not. When the communicating flag FT is set (Yes in S41), the control unit 20 finishes the processing without more steps. When the communicating flag FT is not set (No in S41), that is, in the state that the communication session flag FC is set though the communicating flag FT is reset, the control unit 20 subtracts 1 count (which corresponds to 20 milliseconds) from the holding timer T1 (S42). And the control unit 20 determines whether the holding timer T1 becomes 0 or not by the subtraction. When the holding timer T1 becomes 0 (Yes in S43), the control unit 20 resets the communication session flag to cancel the communication session (S44). In S43, when it is still greater than 0 in the holding timer T1 (No in S43), the control unit 20 finishes the processing without more steps.

Figure 7A:
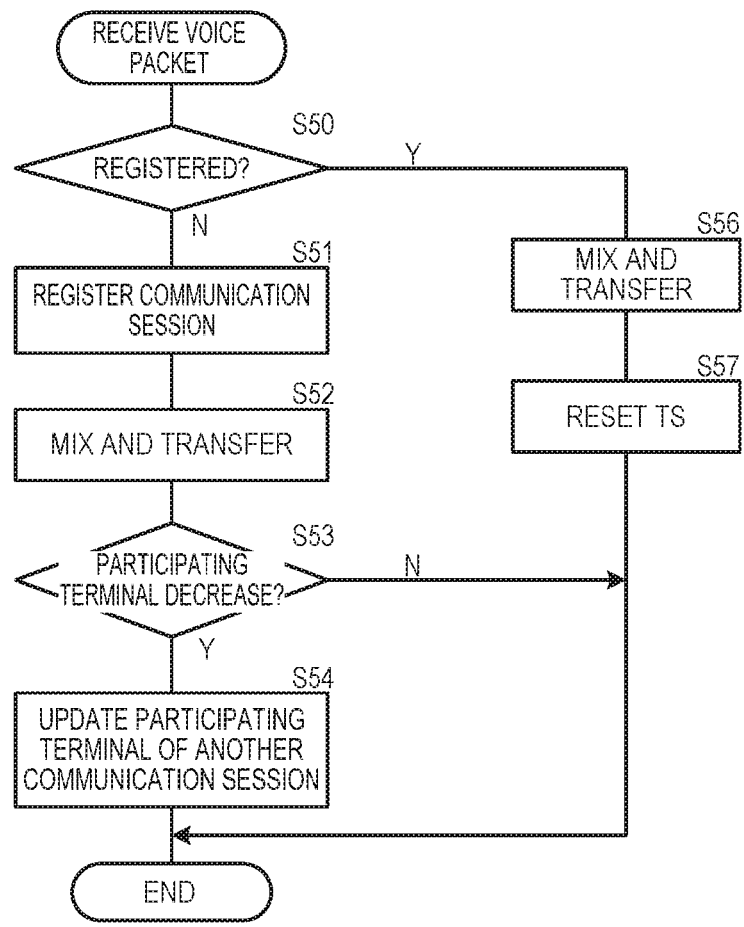
FIG. 7A is a process flowchart of the server.
Figure 7B:
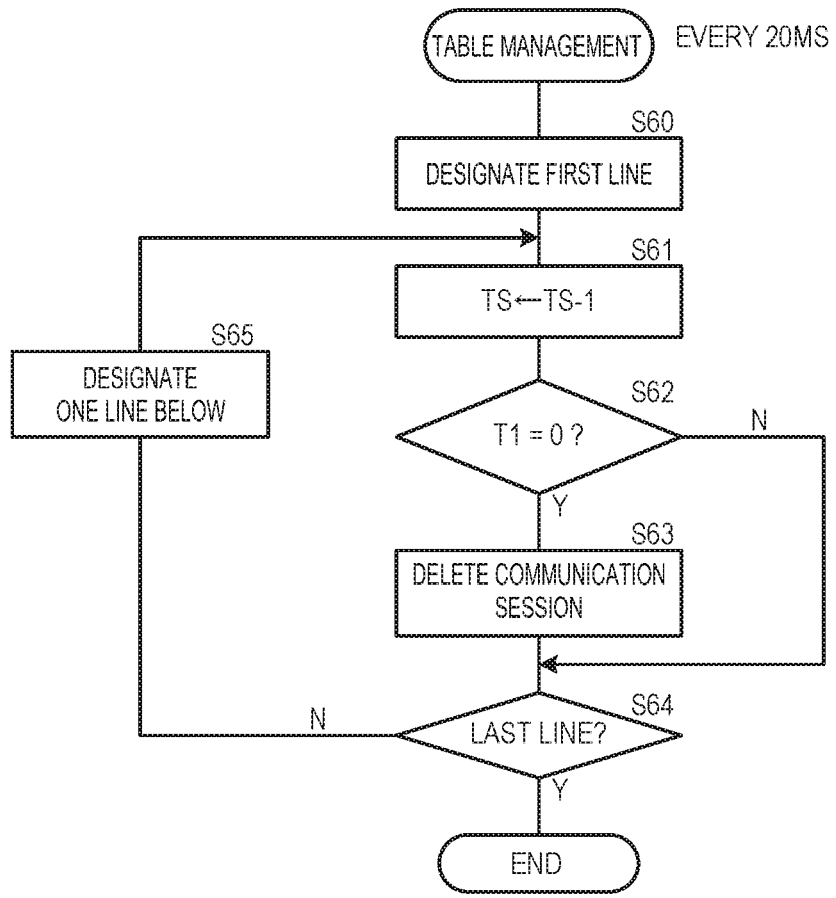
FIG. 7B is a process flowchart of the server.

FIGS. 7A and 7B are flow charts showing the action of the server 11. FIG. 7A shows the processing during receiving the voice packet. FIG. 7B shows the mixing table control processing.

In FIG. 7A, the control unit 30 determines if the communication session identified by a calling source terminal number or a partner communication number has already registered in the mixing table 303 (S50), when the voice packet is received. In case that the communication session has already registered in the mixing table 303 (YES in S50), the control unit 30 transfers the audio signal included in the received voice packet to the terminal device 14 which participates in the communication session on the basis of the participating terminal number of the mixing table 303 (S56), and resets the holding timer TS of the communication session in the mixing table 303 to 30 seconds (S57).

When the received communication session of the voice packet is not registered in the mixing table 303 (No in S50), that is, when the voice packet is the calling voice packet, a new communication session based on this calling voice packet is registered in the mixing table 303 (S51). In this case, the communication partner number is registered as the session number and the terminal number of the terminal device 14 transmitting the voice packet is registered as the calling terminal number. The communicating partner number and the calling terminal number is registered as the participating terminal number in the case of the individual communication session. The calling terminal number and the terminal number of the terminal device 14 which belongs to the group of the communication partner number is registered as the participating terminal number in the case of the group communication session. The calling terminal number is also registered as the extra terminal number, when the calling terminal device does not belong to the group. Furthermore, when any of the terminal device 14, which belongs to the group, is non-active or cannot participate in the communication session such as participating another communication session, the terminal number is excluded from the item of the participating terminal number and transcribed into the item of the excluded terminal number.

The control unit 30 transfers the audio signal of the received voice packet to the terminal device 14 which participates in the communication session (S52). The terminal device 14 which participates in the communication session is determined by the participating terminal number of the communication session registered in the mixing table 303.

The control unit 30 detects the terminal device 14 to be excluded from the participating terminal device of the communication session already registered because of participating the communication session established in S51 (S53). When there is any appropriate terminal device 14 (Yes in S53), the terminal number of the terminal device 14 is deleted from the participating terminal number of the communication session already registered (S54). The excluded terminal number is transcribed into a column of the excluded terminal number. Thus the participating terminal device of each communication session is optimized.

The management processing of the mixing table in FIG. 7B is performed periodically and repeatedly (for each 20 milliseconds, for example). The control unit 30 designates the communication session in the first line of the mixing table 303 at first (S60). The control unit 30 subtracts 1 count (for 20 milliseconds) from the holding timer TS of the designated communication session and determines whether the holding timer TS becomes 0 or not by the subtraction (S62). When the holding timer TS becomes 0 (Yes in S62), the control unit 30 deletes the communication session of the line as the communication session is finished (S63).

The control unit 30 manages the mixing table 303 by performing the processing above in order until the last line of the mixing table 303 (S64, S65).

In the audio communication system of the embodiment, a member (the participating device) of the group session is flexible, rather than fixed. For example, it is possible to participate in the group communication in case that the calling terminal device doesn't belong to the group. Furthermore, even during the group communication, it is also possible to leave it in the middle, and participate in another communication session. Thus, the group communication according to a current communication situation of each terminal device becomes possible.

In the embodiment, the terminal device 14 may be made to participate in the group session in the middle. For example, when only the terminal devices 14 which belong to the group are performing the group communication session and the calling voice packet is transmitted to the group from the terminal device 14 which does not belong to the group, a form of the session may be modified to an extension group communication, making the terminal device 14 participate in the group session which is being performed. Furthermore, when the extension group communication is in service and the calling packet is transmitted to the extension group from another terminal device 14 which does not belong to the group, the terminal device 14 may also be made to participate in the in-service extension group communication session.

In the embodiment, a non-active terminal device is excluded from the communication session as the excluded terminal device in the group communication and the extension group communication. However, the terminal device may be made to participate in the communication session when it becomes active.

In the embodiment, the extension group communication between groups may made to be possible. For example, by a terminal device which belongs to a group calling another group on behalf of the group, the server 11 establishes the communication session of the extension group which consists of all terminal device of the group to which the terminal device belongs and the called group.

In the embodiment, the communication session is established in response to the calling voice packet transmitted from the terminal device 14, however, a trigger for establishing the communication session is not limited to this. For example, the administrator may establish and cancel the mixing group by operating the mixing table 30 from the management device 12. Furthermore, the management device 12 may establish and cancel the extension group communication among the groups mentioned above. It is possible to manage totally and modify flexibly the mixing group in the way.

REFERENCE NUMERALS

11 server (relaying device)
12 management device
13 wireless access point
14 terminal device
20 control unit (of the terminal device)
30 control unit (of the server)
32 network communication unit
220 PTT (Push-To-Talk) switch
301 terminal table
302 group table
303 mixing table (session table)

What is claimed is:

1. A relaying device comprising:
a network communication circuit for communicating with a terminal device via a network;
a processor for controlling communication with the terminal device; and
a memory in which a session table is provided, wherein
the network communication circuit receives an audio signal to which information designating the terminal device of a communication partner is attached from the terminal device,
the processor registers a communication session made up of the terminal device transmitting the audio signal and the terminal device designated by the designating information attached to the audio signal as participating terminals into the session table when the audio signal is received from the terminal device,
the processor transfers the audio signal received from the participating terminals including the audio signal to the participating terminals,
the processor mixes the audio signals and transmits the mixed audio signal to the participating terminals when the audio signals are received from two or more participating terminals at the same time,
the processor registers a new communication session made up of the terminal device transmitting the audio signal and the terminal device designated by the designating information as the participating terminals into the session table of the memory when the audio signal to which the designating information designating at least one of the terminal devices which is not included to the participating terminal of the communication session registered in the session table is received,
when the participating terminals of the newly registered communication session includes a participating terminal of another communication session registered beforehand, the processor deletes the terminal device which participates in both communication sessions from the communication session registered beforehand.

2. The relaying device according to claim 1, wherein to the terminal device which transmits the audio signal, the processor transmits the mixed audio signal mixed the received audio signals excluding the signal received from the transmitting terminal device itself.

3. The relaying device according to claim 1, wherein the processor deregisters the communication session from the session table when a predetermined time or more elapses without receiving the audio signal from any of the participating terminals.

4. The relaying device according to claim 1, further comprising:
a group table storing a prepared group to which the terminal devices belong in the memory,
wherein the processor registers the communication session made up of the terminal device transmitting the audio signal and the terminal device belonging to the prepared group as the participating terminals into the session table of the memory
when the designating information attached to the audio signal received from the terminal device designates the prepared group.

5. An audio communication system comprising:
a terminal device having a microphone, an audio output unit, and a terminal network communication unit;
a relaying device having a network communication circuit, a processor, and a memory; wherein
the terminal network communication unit of the terminal device and the network communication circuit of the relaying device transmit and receive an audio signal via network,
the terminal device attaches designating information designated the terminal device of a communication partner to the audio signal input from the microphone, and transmits it to the relaying device with the terminal network communication unit,
a session table is provided in the memory of the relaying device,
the network communication circuit of the relaying device receives the audio signal to which the designating information is attached from the terminal device,
the processor registers a communication session made up of the terminal device transmitting the audio signal and the terminal device designated by the designating information attached to the audio signal as participating terminals into the session table when the audio signal is received from the terminal device,
the processor transfers the audio signal received from the participating terminals including the audio signal to the participating terminals, the processor mixes the audio signals and transmits the mixed audio signal to the participating terminals when the audio signals are received from two or more participating terminals at the same time,
a voice reproduction unit of the terminal device reproduces the audio signal received from the relaying device,
the processor registers a new communication session made up of the terminal device transmitting the audio signal and the terminal device designated by the designating information as the participating terminals into the session table of the memory when the audio signal to which the designating information designating at least one of the terminal devices which is not included to the participating terminal of the communication session registered in the session table is received,
when the participating terminals of the newly registered communication session includes a participating terminal of another communication session registered beforehand, the processor deletes the terminal device which participates in both communication sessions from the communication session registered beforehand.

6. The audio communication system according to claim 5, wherein
the terminal device further comprises a push-to-talk circuit, and
the terminal network communication unit transmits the audio signal input from the microphone to the relaying device while the push-to-talk circuit is in ON status, and receives the audio signal transmitted from the relaying device regardless of that the push-to-talk circuit is in ON/OFF status.

7. The audio communication system according to claim 5, wherein
the network comprises a plurality of access points for the wireless local area network, and
the terminal network communication unit of the terminal device connects to the network via any one of the access points.

8. A relaying method for the audio signal comprising:
relaying an audio signal by using a relaying device having a terminal device, a network communication circuit for communicating via network, and a memory in which a session table is provided;
a first step for registering a communication session made up of the terminal device transmitting the audio signal and the terminal device designated by designating information attached to the audio signal as participating terminals into the session table when the audio signal is received from the terminal device;
a second step for transferring the audio signal received from the participating terminals including the audio signal to the participating terminals; and
a third step for mixing the audio signals and transmitting the mixed audio signal to the participating terminals when the audio signals are received from two or more participating terminals at the same time, wherein
the first step registers a new communication session made up of the terminal device transmitting the audio signal and the terminal device designated by the designating information as the participating terminals into the session table of the memory when the audio signal to which the designating information designating at least one of the terminal devices which is not included to the participating terminal of the communication session registered in the session table is received, and
when the participating terminals of the newly registered communication session includes a participating terminal of another communication session registered beforehand, the first step deletes the terminal device which participates in both communication sessions from the communication session registered beforehand.

9. The relaying method for the audio signal to claim 8, wherein
to the terminal device which transmits the audio signal, the third step transmits the mixed audio signal mixed the received audio signals excluding the signal received from the transmitting terminal device itself.

10. The relaying method for the audio signal to claim 8, wherein the first step deregisters the communication session from the session table when a predetermined time or more elapses without receiving the audio signal from any of the participating terminals.

11. The relaying method for the audio signal to claim 8, wherein the first step registers the communication session made up of the terminal device transmitting the audio signal and the terminal device belonging to a prepared group as the participating terminals into the session table of the memory when the designating information attached to the audio signal received from the terminal device designates the prepared group.

12. A relaying device comprising:

a network communication circuit for communicating with a terminal device via a network;

a processor for controlling communication with the terminal device; and a memory in which a session table is provided; and a group table storing a prepared group to which terminal devices belong in the memory, wherein the network communication circuit receives an audio signal to which information designating the terminal device of a communication partner is attached from the terminal device, the processor registers a communication session made up of the terminal device transmitting the audio signal and the terminal device designated by the designating information attached to the audio signal as participating terminals into the session table when the audio signal is received from the terminal device, the processor transfers the audio signal received from the participating terminals including the audio signal to the participating terminals, the processor mixes the audio signals and transmits the mixed audio signal to the participating terminals when the audio signals are received from two or more participating terminals at the same time, the terminal device transmitting the audio signal does not belong to the prepared group, when the designating information attached to the audio signal received from the terminal device designates the prepared group, the processor registers the communication session made up of the terminal device transmitting the audio signal and the terminal device belonging to the prepared group as the participating terminals into the session table of the memory, and the communication session represents a communication state of a communication established among the terminal devices after the audio signal is transmitted and received by the terminal devices.

13. A relaying method for the audio signal comprising:

relaying an audio signal by using a relaying device having a terminal device, a network communication circuit for communicating via network, and a memory in which a session table is provided;

a first step for registering a communication session made up of the terminal device transmitting the audio signal and the terminal device designated by designating information attached to the audio signal as participating terminals into the session table when the first audio signal is received from the terminal device;

a second step for transferring the audio signal received from the participating terminals including the audio signal to the participating terminals; and a third step for mixing the audio signals and transmitting the mixed audio signal to the participating terminals when the audio signals are received from two or more participating terminals at the same time, wherein the terminal device transmitting the audio signal does not belong to the prepared group, the first step registers the communication session made up of the terminal device transmitting the audio signal and the terminal device belonging to the prepared group as the participating terminals into the session table of the memory when the designating information attached to the audio signal received from the terminal device designates the prepared group, and the communication session represents a communication state of a communication established among the terminal devices after the audio signal is transmitted and received by the terminal devices.

\* \* \* \* \*